US011952745B2

(12) United States Patent
Saigo et al.

(10) Patent No.: US 11,952,745 B2
(45) Date of Patent: Apr. 9, 2024

(54) CONTROL DEVICE AND CONTROL METHOD FOR LOADING MACHINE

(71) Applicant: KOMATSU LTD., Tokyo (JP)

(72) Inventors: Yusuke Saigo, Tokyo (JP); Kazuhiro Hatake, Tokyo (JP)

(73) Assignee: KOMATSU LTD., Tokyo (JP)

( * ) Notice: Subject to any disclaimer, the term of this patent is extended or adjusted under 35 U.S.C. 154(b) by 802 days.

(21) Appl. No.: 17/045,858

(22) PCT Filed: Mar. 12, 2019

(86) PCT No.: PCT/JP2019/010121

§ 371 (c)(1),
(2) Date: Oct. 7, 2020

(87) PCT Pub. No.: WO2019/207994

PCT Pub. Date: Oct. 31, 2019

(65) Prior Publication Data

US 2021/0156114 A1 May 27, 2021

(30) Foreign Application Priority Data

Apr. 27, 2018 (JP) ................................ 2018-087703

(51) Int. Cl.

*E02F 9/12* (2006.01)
*E02F 3/30* (2006.01)

(Continued)

(52) U.S. Cl.

CPC .............. *E02F 9/123* (2013.01); *E02F 3/308* (2013.01); *E02F 3/434* (2013.01); *E02F 9/2033* (2013.01);

(Continued)

(58) Field of Classification Search

CPC . E02F 9/123; E02F 3/308; E02F 3/434; E02F 9/2033; E02F 9/2228; E02F 9/2292; F15B 7/001; F15B 15/20

(Continued)

(56) References Cited

U.S. PATENT DOCUMENTS 6,330,797 B1 12/2001 Kondo
2018/0251956 A1 9/2018 Hoshaku et al.
2019/0063041 A1 2/2019 Izumi et al.

FOREIGN PATENT DOCUMENTS

EP 3 244 069 A1 11/2017
JP 9-256407 A 9/1997

(Continued)

OTHER PUBLICATIONS

English Translation for JP-2016089389-A (Year: 2023).*

(Continued)

*Primary Examiner* — Mahmoud S Ismail
(74) *Attorney, Agent, or Firm* — Global IP Counselors, LLP

(57) ABSTRACT

A movement processing unit generates a work equipment operation signal for moving a bucket to a loading point and a swing operation signal related to a target swing speed, based on a command for starting an automatic movement of the bucket. A target speed changing unit changes the target swing speed so that the work equipment does not interfere with the loading target during a swing of a swing body.

6 Claims, 7 Drawing Sheets

(51) Int. Cl.
*E02F 3/43* (2006.01)
*E02F 9/20* (2006.01)
*E02F 9/22* (2006.01)
*F15B 7/00* (2006.01)
*F15B 15/20* (2006.01)

(52) U.S. Cl.
CPC .......... *E02F 9/2228* (2013.01); *E02F 9/2292* (2013.01); *F15B 7/001* (2013.01); *F15B 15/20* (2013.01)

(58) Field of Classification Search
USPC ............................................................ 701/50
See application file for complete search history.

(56) References Cited

FOREIGN PATENT DOCUMENTS

| | | | | |
|---|---|---|---|---|
| JP | 10-88627 | A | | 4/1998 |
| JP | 10-212740 | A | | 8/1998 |
| JP | 2014-122654 | A | | 7/2014 |
| JP | 2016-89389 | A | | 5/2016 |
| JP | 2016089389 | A | * | 5/2016 |
| JP | 2017-44027 | A | | 3/2017 |
| JP | 2018-3515 | A | | 1/2018 |
| WO | 2016/111205 | A1 | | 7/2016 |

OTHER PUBLICATIONS

The International Search Report for the corresponding international application No. PCT/JP2019/010121, dated May 7, 2019.

* cited by examiner

CONTROL DEVICE AND CONTROL METHOD FOR LOADING MACHINE

CROSS-REFERENCE TO RELATED APPLICATIONS

This application is a U.S. National stage application of International Application No. PCT/JP2019/010121, filed on Mar. 12, 2019. This U.S. National stage application claims priority under 35 U.S.C. § 119(a) to Japanese Patent Application No. 2018-087703, filed in Japan on Apr. 27, 2018, the entire contents of which are hereby incorporated herein by reference.

BACKGROUND

Field of the Invention

The present invention relates to a control device and a control method of a loading machine.

Background Information

Japanese Unexamined Patent Application Publication No. H9-256407. discloses a technology relating to automatic loading control of a loading machine. The automatic loading control is control for moving a bucket to a loading point by which a control device receives designation of the loading point from an operator, and the like, of a loading machine and controls operations of a swing body and work equipment.

In the automatic loading control of the loading machine, when a rising speed of work equipment is lower than an assumed speed or when a swing speed of the swing body is higher than an assumed speed, there is a possibility that the bucket and a loading target interfere with each other.

An object of the present invention is to provide a control device and a control method for a loading machine that control a swing so that a bucket and a loading target do not interfere with each other during a swing in automatic loading.

According to a first aspect of the present invention, a control device for controlling a loading machine including a swing body that swings about a swing center and work equipment that is attached to the swing body and has a bucket, includes: a movement processing unit that is configured to generate a work equipment operation signal for moving the bucket to a loading point and a swing operation signal related to a target swing speed, based on a command for starting a moving operation for moving the bucket to the loading point without an operation of an operator; and a target speed changing unit that is configured to change the target swing speed so that the work equipment does not interfere with the loading target during a swing of the swing body.

According to the above aspect, the control device of the loading machine can control the swing such that the bucket and the loading target do not interfere with each other during the swing in the automatic loading.

DETAILED DESCRIPTION OF EMBODIMENT(S)

Hereinafter, an embodiment will be described in detail with reference to the drawings.

First Embodiment

<<Configuration of Loading Machine>>

Figure 1:
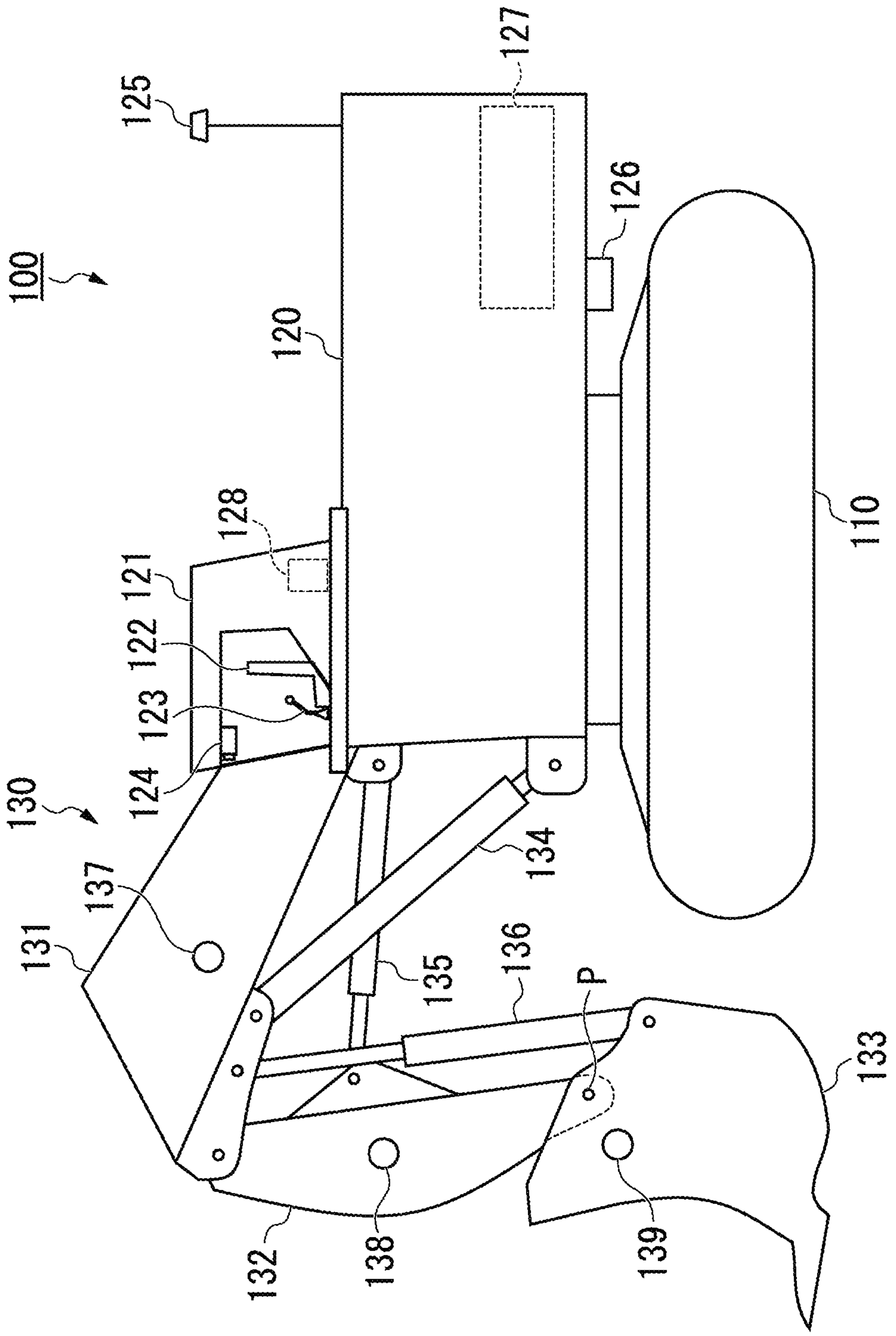
FIG. 1 is a schematic diagram showing a configuration of a loading machine according to a first embodiment.

FIG. 1 is a schematic diagram showing a configuration of a loading machine according to a first embodiment.

A loading machine 100 is a loading machine that performs loading of earth to a transport vehicle or the like. The loading machine 100 according to the first embodiment is a hydraulic excavator. In addition, the loading machine 100 according to another embodiment may be a loading machine other than a hydraulic excavator. Although the loading machine 100 shown in FIG. 1 is a face shovel, it may be a backhoe shovel or a rope shovel.

The loading machine 100 includes a travel body 110, a swing body 120 supported by the travel body 100, and work equipment 130 operated by hydraulic pressure and supported by the swing body 120. The swing body 120 is supported so as to be capable of swinging about a swing center.

The work equipment 130 includes a boom 131, an arm 132, a bucket 133, a boom cylinder 134, an arm cylinder 135, a bucket cylinder 136, a boom angle sensor 137, an arm angle sensor 138, and a bucket angle sensor 139.

A base end portion of the boom 131 is attached to the swing body 120 via a pin.

The arm 132 connects the boom 131 and the bucket 133. A base end portion of the arm 132 is attached to the front-end portion of the boom 131 via a pin.

The bucket 133 includes a blade for excavating earth and the like and a vessel for accommodating excavated earth. A base end portion of the bucket 133 is attached to a front-end portion of the arm 132 via a pin.

The boom cylinder 134 is a hydraulic cylinder for actuating the boom 131. A base end portion of the boom cylinder 134 is attached to the swing body 120. A front-end portion of the boom cylinder 134 is attached to the boom 131.

The arm cylinder 135 is a hydraulic cylinder for driving the arm 132. A base end portion of the arm cylinder 135 is attached to the boom 131. A front-end portion of the arm cylinder 135 is attached to the arm 132.

The bucket cylinder 136 is a hydraulic cylinder for driving the bucket 133. A base end portion of the bucket cylinder 136 is attached to the boom 131. A front-end portion of the bucket cylinder 136 is attached to the bucket 133.

The boom angle sensor 137 is attached to the boom 131 and detects an inclination angle of the boom 131.

The arm angle sensor 138 is attached to the arm 132 and detects an inclination angle of the arm 132.

The bucket angle sensor 139 is attached to the bucket 133 and detects the inclination angle of the bucket 133.

Each of the boom angle sensor 137, the arm angle sensor 138, and the bucket angle sensor 139 according to the first embodiment detects the inclination angle with respect to the ground plane. In addition, the angle sensor according to another embodiment is not limited to this, and the inclination angle with respect to another reference surface may be detected. For example, in another embodiment, the angle sensor may detect a relative rotation angle by a potentiometer provided in each base end portion of the boom 131, the arm 132, or the bucket 133, and may detect an inclination angle by measuring each cylinder length of the boom cylinder 134, the arm cylinder 135, and the bucket cylinder 136 and converting the cylinder lengths into an angle.

In the swing body 120, a cab 121 is provided. Inside the cab 121, an operator's seat 122 on which the operator sits, an operation device 123 for operating the loading machine 100, and a detection device 124 for detecting a three-dimensional position of the object existing in the detection direction are provided. In response to an operation of an operator, the operation device 123 generates an operation signal of the boom cylinder 134, an operation signal of the arm cylinder 135, an operation signal of the bucket cylinder 136, a swing operation signal of the swing body 120 to left and right, and a travel operation signal for forward and backward movement of the travel body 110, and outputs the generated operation signal to the control device 128. Further, the operation device 123 generates a loading command signal for causing the work equipment 130 to start the automatic loading control in response to the operation of the operator, and outputs the generated loading command signal to the control device 128. The loading command signal is an example of a command to start an automatic movement of the bucket 133 (a movement operation for moving the bucket 133 to the loading point without the operation by the operator). The operation device 123 is constituted by, for example, a lever, a switch, and a pedal. The loading command signal is generated by an operation of the switch. For example, when the switch is turned on, the loading command signal is output. The operation device 123 is disposed in the vicinity of the operator's seat 122. The operation device 123 is located within a range operable by the operator when the operator sits on the operator's seat 122.

Examples of the detection device 124 include a stereo camera, a laser scanner, an ultra-wide band (UWB) ranging device, and the like. The detection device 124 is provided, for example, such that the detection direction faces the front of the cab 121 of the loading machine 100. The detection device 124 specifies a three-dimensional position of an object in a coordinate system based on a position of the detection device 124.

In addition, the loading machine 100 according to the first embodiment operates in response to the operation of the operator sitting on the operator's seat 122, but another embodiment is not limited thereto. For example, the loading machine 100 according to another embodiment may operate by transmitting an operation signal and a loading command signal by a remote operation of an operator operated outside the loading machine 100.

Figure 2:
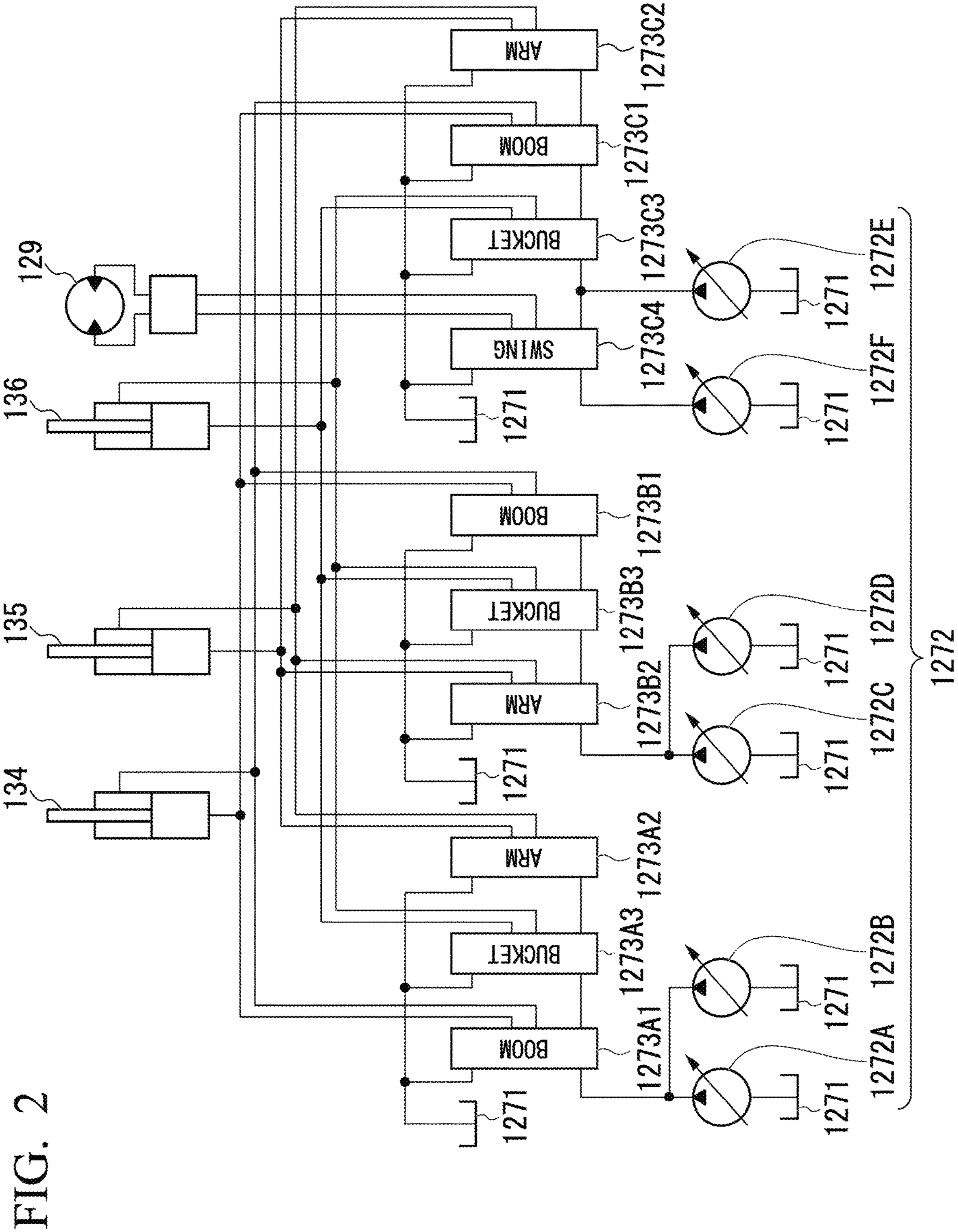
FIG. 2 is a schematic diagram showing a configuration of a hydraulic device of a loading machine according to the first embodiment.

The loading machine 100 includes a position and azimuth direction calculator 125, an inclination measuring device 126, a hydraulic device 127, a control device 128, and a swing motor 129 (see FIG. 2).

The position and azimuth direction calculator 125 calculates the position of the swing body 120 and the azimuth direction in which the swing body 120 faces. The position and azimuth direction calculator 125 includes two receivers that receive a positioning signal from a satellite configuring a GNSS. The two receivers are each installed at different positions of the swing body 120. The position and azimuth direction calculator 125 detects a position of the representative point of the swing body 120 in a site coordinate system (the origin of an excavator coordinate system) on the basis of the positioning signal received by the receiver.

The position and azimuth direction calculator 125 calculates the azimuth direction in which the swing body 120 faces, as a relationship of an installation position of the other receiver with respect to an installation position of one receiver by using the positioning signals received by the two receivers.

The inclination measuring device 126 measures an acceleration and an angular velocity (swing speed) of the swing body 120, and detects a posture of the swing body 120 (for example, the roll angle, the pitch angle, and the yaw angle) based on the measurement result. The inclination measuring device 126 is installed, for example, on a lower surface of the swing body 120. For example, an inertial measurement unit (IMU) may be used as the inclination measuring device 126.

The hydraulic device 127 supplies operating oil to the boom cylinder 134, the arm cylinder 135, the bucket cylinder 136, the swing motor 129, and left and right travel motors (not shown) in response to an operation signal by the control device 128.

The control device 128 receives an operation signal from the operation device 123. The control device 128 drives the hydraulic device 127 on the basis of the received operation signal.

The swing motor 129 is a motor for swinging the swing body 120.

<<Configuration of Hydraulic Device>>

FIG. 2 is a schematic diagram showing a configuration of a hydraulic device of the loading machine according to the first embodiment.

The hydraulic device 127 includes an operating oil tank 1271, a plurality of hydraulic pumps 1272, and a plurality of flow rate control valves 1273. More specifically, the hydraulic device 127 includes an operating oil tank 1271, a first hydraulic pump 1272A, a second hydraulic pump 1272B, a third hydraulic pump 1272C, a fourth hydraulic pump 1272D, a fifth hydraulic pump 1272E, a sixth hydraulic pump 1272F, a first boom flow rate control valve 1273A1, a first arm flow rate control valve 1273A2, a first bucket flow rate control valve 1273A3, a second boom flow rate control valve 1273B1, a second arm flow rate control valve 1273B2, a second bucket flow rate control valve 1273B3, a third boom flow rate control valve 1273C1, a third arm flow rate control valve 1273C2, a third bucket flow rate control valve 1273C3, a swing flow rate control valve 1273C4, a left travel flow rate control valve (not shown), and a right travel flow rate control valve (not shown).

The hydraulic pump 1272 is driven by power of an engine (not shown), and supplies operating oil, through each flow rate control valve 1273, to the boom cylinder 134, the arm cylinder 135, the bucket cylinder 136, the swing motor 129, and a travel motor (not shown) that causes the travel body 110 to travel. Each flow rate control valve 1273 has a rod-shaped spool, and adjusts the flow rate of the operating oil to be supplied to the boom cylinder 134, the arm cylinder 135, the bucket cylinder 136, the swing motor 129, and the travel body 110 according to a position of the spool. The spool is driven based on a control command received from the control device 128. That is, the amount of operating oil supplied to the boom cylinder 134, the arm cylinder 135, the bucket cylinder 136, and the swing motor 129 is controlled by the control device 128.

The first hydraulic pump 1272A and the second hydraulic pump 1272B are connected in the order corresponding to the first boom flow rate control valve 1273A1, the first bucket flow rate control valve 1273A3, and the first arm flow rate control valve 1273A2. That is, the first boom flow rate control valve 1273A1 supplies the operating oil discharged by the first hydraulic pump 1272A and the second hydraulic pump 1272B to the boom cylinder 134. The first bucket flow rate control valve 1273A3 supplies the operating oil that has not been supplied to the boom cylinder 134 out of the operating oil discharged by the first hydraulic pump 1272A and the second hydraulic pump 1272B, to the bucket cylinder 136. The first arm flow rate control valve 1273A2 supplies the operating oil that has not been supplied to the boom cylinder 134 and the bucket cylinder 136 out of the operating oil discharged by the first hydraulic pump 1272A and the second hydraulic pump 1272B, to the arm cylinder 135.

The third hydraulic pump 1272C and the fourth hydraulic pump 1272D are connected in the order corresponding to the second arm flow rate control valve 1273B2, the second bucket flow rate control valve 1273B3, and the second boom flow rate control valve 1273B1. That is, the second arm flow rate control valve 1273B2 supplies the operating oil discharged by the third hydraulic pump 1272C and the fourth hydraulic pump 1272D to the arm cylinder 135. The second bucket flow rate control valve 1273B3 supplies the operating oil that has not been supplied to the arm cylinder 135 out of the operating oil discharged by the third hydraulic pump 1272C and the fourth hydraulic pump 1272D, to the bucket cylinder 136. The second boom flow rate control valve 1273B1 supplies the operating oil that has not been supplied to the arm cylinder 135 and the bucket cylinder 136 out of the operating oil discharged by the third hydraulic pump 1272C and the fourth hydraulic pump 1272D, to the boom cylinder 134.

The fifth hydraulic pump 1272E is connected in the order corresponding to the third bucket flow rate control valve 1273C3, the third boom flow rate control valve 1273C1, and the third arm flow rate control valve 1273C2. Further, the sixth hydraulic pump 1272F is connected in this order corresponding to the swing flow rate control valve 1273C4, the third bucket flow rate control valve 1273C3, the third boom flow rate control valve 1273C1, and the third arm flow rate control valve 1273C2.

That is, the swing flow rate control valve 1273C4 supplies the operating oil discharged by the sixth hydraulic pump 1272F to the swing motor 129. The third bucket flow rate control valve 1273C3 supplies the operating oil that has not been supplied to the swing motor 129 out of the operating oil discharged by the sixth hydraulic pump 1272F and operating oil that is discharged by the fifth hydraulic pump 1272E, to the bucket cylinder 136. The third boom flow rate control valve 1273C1 supplies the operating oil that has not been supplied to the swing motor 129 and the bucket cylinder 136 out of the operating oil discharged by the sixth hydraulic pump 1272F, and the operating oil that has not been supplied to the bucket cylinder 136 out of the operating oil discharged by the fifth hydraulic pump 1272E, to the boom cylinder 134. The third arm flow rate control valve 1273C2 supplies the operating oil that has not been supplied to the swing motor 129, the bucket cylinder 136, and the boom cylinder 134 out of the operating oil that is discharged by the sixth hydraulic pump 1272F, and the operating oil that has not been supplied to the bucket cylinder 136 and the boom cylinder 134 out of the operating oil that is discharged by the fifth hydraulic pump 1272E, to the arm cylinder 135.

That is, the first boom flow rate control valve 1273A1, the first arm flow rate control valve 1273A2, the first bucket flow rate control valve 1273A3, the second boom flow rate control valve 1273B1, the second arm flow rate control valve 1273B2, the second bucket flow rate control valve 1273B3, the third boom flow rate control valve 1273C1, the third arm flow rate control valve 1273C2, and the third bucket flow rate control valve 1273C3 are examples of work equipment-side flow rate control valves that control the flow rate of the operating oil flowing through the actuator that operates the work equipment 130. Further, the swing flow rate control valve 1273C4 is an example of a swing-side flow rate control valve that controls the flow rate of the operating oil flowing through the swing motor 129.

Further, the first hydraulic pump 1272A, the second hydraulic pump 1272B, the third hydraulic pump 1272C, the fourth hydraulic pump 1272D, and the fifth hydraulic pump 1272E are examples of a first pump that is connected to only the work equipment-side flow rate control valve. The sixth hydraulic pump 1272F is an example of a second pump that is connected to the swing-side flow rate control valve and the work equipment-side flow rate control valve.

In addition, the configuration of the hydraulic device 127 is not limited to the configuration shown in the FIG. 2.

<<Configuration of Control Device>>

Figure 3:
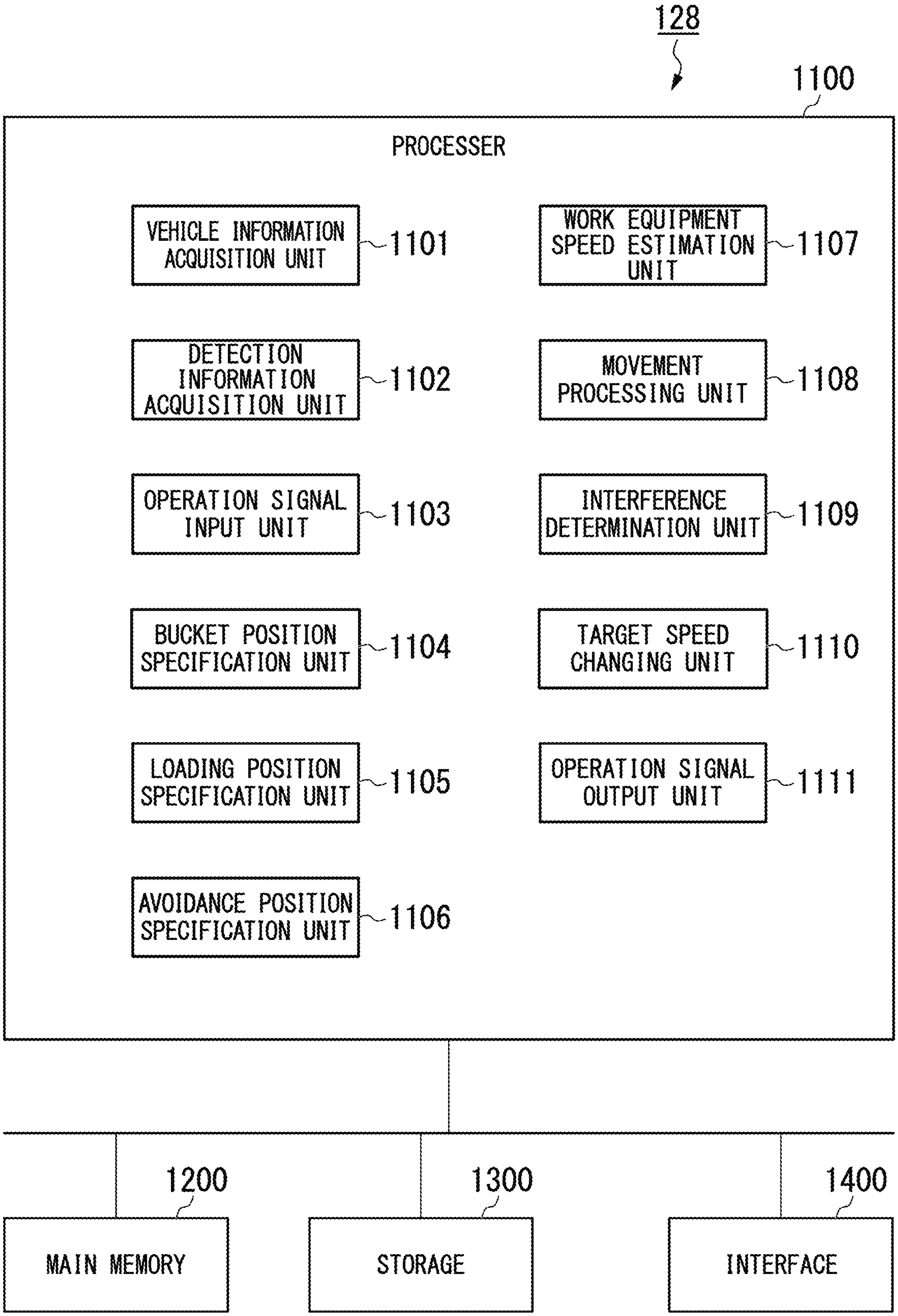
FIG. 3 is a schematic block diagram showing a configuration of a control device according to the first embodiment.

FIG. 3 is a schematic block diagram showing a configuration of the control device according to the first embodiment.

The control device 128 is a computer having a processor 1100, a main memory 1200, a storage 1300, and an interface 1400. The storage 1300 stores a program. The processor 1100 reads the program from the storage 1300, loads the program in the main memory 1200, and executes the processing according to the program.

Examples of the storage 1300 include a HDD, an SSD, a magnetic disk, a magneto-optical disk, a CD-ROM, a DVD-ROM, and the like. The storage 1300 may be an internal medium directly connected to a common communication line of the control device 128, or may be an external medium connected to the control device 128 via the interface 1400. The storage 1300 is a non-transitory tangible storage medium.

The processor 1100 includes a vehicle information acquisition unit 1101, a detection information acquisition unit 1102, an operation signal input unit 1103, a bucket position specification unit 1104, a loading position specification unit 1105, an avoidance position specification unit 1106, a work equipment speed estimation unit 1107, a movement processing unit 1108, an interference determination unit 1109, a target speed changing unit 1110, and an operation signal output unit 1111 by the execution of the program.

The vehicle information acquisition unit 1101 acquires the swing speed, the position and the azimuth direction of the swing body 120, the inclination angles of the boom 131, the arm 132, and the bucket 133, the travel speed of the travel body 110, and the posture of the swing body 120. Hereinafter, information related to the loading machine 100 acquired by the vehicle information acquisition unit 1101 will be referred to as vehicle information.

The detection information acquisition unit 1102 acquires the three-dimensional position information from the detection device 124 and specifies the position and the shape of the loading target 200 (for example, a transport vehicle or a hopper).

The operation signal input unit 1103 receives an input of an operation signal from the operation device 123. The operation signal includes the operation signal of the boom 131, the operation signal of the arm 132, the operation signal of the bucket 133, the swing operation signal of the swing body 120, the travel operation signal of the travel body 110, and the loading command signal of the loading machine 100.

Figure 4:
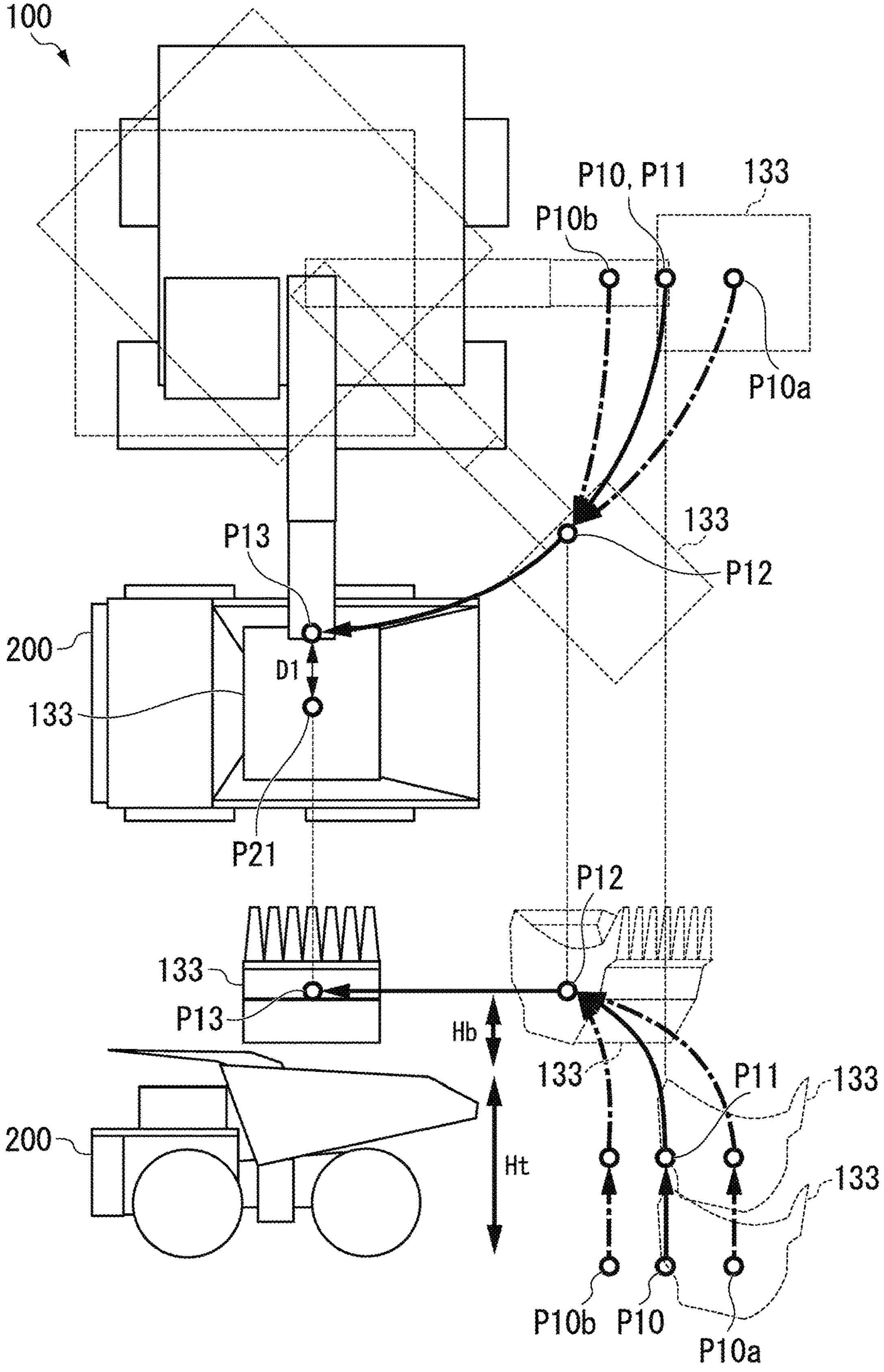
FIG. 4 is a diagram showing an example of a path of a bucket related to the first embodiment.

Based on the vehicle information acquired by the vehicle information acquisition unit 1101, the bucket position specification unit 1104 specifies a position P of a tip end of the arm 132 in the excavator coordinate system and the height Hb from the tip end of the arm 132 to the lowermost point of the bucket 133. The lowermost point of the bucket 133 refers to a point where a distance from the ground surface to the outer shape of the bucket 133 is shortest. In particular, the bucket position specification unit 1104 specifies the position P of the tip end of the arm 132 when an input of the loading command signal is received as an excavation completion position P10. FIG. 4 is a diagram showing an example of a path of a bucket according to the first embodiment. Specifically, the bucket position specification unit 1104 obtains a vertical direction component and a horizontal direction component of a length of the boom 131 based on the inclination angle of the boom 131 and the known length of the boom 131 (the distance from the pin of the base end portion to the pin of the front-end portion). Similarly, the bucket position specification unit 1104 obtains a vertical direction component and a horizontal direction component of a length of the arm 132. The bucket position specification unit 1104 specifies, from the position of the loading machine 100, a position that is separated by the sum of the vertical direction components and the sum of the horizontal direction components of the lengths of the boom 131 and the arm 132 in a direction specified by the azimuth direction and the posture of the loading machine 100, as a position P of the tip end of the arm 132 (a pin position P of the front-end portion of the arm 132 shown in FIG. 1). Further, the bucket position specification unit 1104 specifies the lowermost point in the vertical direction of the bucket 133 based on the inclination angle of the bucket 133 and the known shape of the bucket 133, and specifies the height Hb from the tip end of the arm 132 to the lowermost point of the bucket 133.

When the loading command signal is input to the operation signal input unit 1103, the loading position specification unit 1105 specifies the loading position P13 on the basis of a position and a shape of the loading target 200 specified by the detection information acquisition unit 1102. The loading position specification unit 1105 converts a loading point P21 indicated by position information of the loading target 200 from the site coordinate system to the excavator coordinate system on the basis of the position, the azimuth direction, and the posture of the swing body 120 acquired by the vehicle information acquisition unit 1101. The loading position specification unit 1105 specifies, from the specified loading point P21, a position separated by a distance D1 from the center of the bucket 133 to the tip end of the arm 132 in the direction in which the swing body 120 of the loading machine 100 faces, as a planar position of the loading position P13. That is, when the tip end of the arm 132 is positioned at the loading position P13, the center of the bucket 133 is located at the loading point P21. Therefore, the control device 128 can move the center of the bucket 133 to the loading point P21 by controlling the tip end of the arm 132 so as to move to the loading position P13. The loading position specification unit 1105 specifies the height of the loading position P13 by adding, to a height Ht of the loading target 200, the height Hb specified by the bucket position specification unit 1104 and being from the tip end of the arm 132 to the lowermost point of the bucket 133, and a height of the control margin of the bucket 133. In addition, in another embodiment, the loading position specification unit 1105 may specify the loading position P13 without adding the height of the control margin. That is, the loading position specification unit 1105 may specify the height of the loading position P13 by adding the height Hb to the height Ht.

The avoidance position specification unit 1106 specifies the interference avoidance position P12 that is a point at which the bucket 133 does not interfere with the loading target 200, based on the loading position P13 specified by the loading position specification unit 1105, the position of the loading machine 100 acquired by the vehicle information acquisition unit 1101, and the position and the shape of the loading target 200 specified by the detection information acquisition unit 1102. The interference avoidance position P12 has the same height as the loading position P13, and the distance from the swing center of the swing body 120 is equal to the distance from the swing center to the loading position P13 and is a position at which the loading target 200 is not present below. The avoidance position specification unit 1106 specifies, for example, a circle centered on the swing center of the swing body 120 and having a radius as the distance between the swing center and the loading position P13, and specifies a position that is the closest to the loading position P13 and at which an external shape of the bucket 133 does not interfere with the loading target 200 from among the positions on the circle when seen from a plan view, as the interference avoidance position P12. The avoidance position specification unit 1106 can determine whether or not the loading target 200 and the bucket 133 interfere with each other based on the position and shape of the loading target 200 and the known shape of the bucket 133. Here, the terms “the same height” and “the same distance” are not necessarily limited to the case where the heights or the distances are perfectly matched, and a slight error or a margin is allowed thereon.

The work equipment speed estimation unit 1107 estimates the speed of the work equipment 130 when the swing body 120 is swinging. Specifically, when the swing body 120 is not swinging, all operating oil discharged from each of the hydraulic pumps 1272 is supplied to the boom cylinder 134, the arm cylinder 135, and the bucket cylinder 136. On the other hand, when the swing body 120 is swinging, the flow rate reduced by the amount of the operating oil flowing from the sixth hydraulic pump 1272F to the swing motor 129 is supplied to the boom cylinder 134, the arm cylinder 135, and the bucket cylinder 136 from among all operating oil discharged from each of the hydraulic pumps 1272. Therefore, in the first embodiment, the work equipment speed estimation unit 1107 estimates the velocity of the work equipment 130 when swing body 120 is swinging, based on the sum of the discharge flow rates of the first hydraulic pump 1272A, the second hydraulic pump 1272B, the third hydraulic pump 1272C, the fourth hydraulic pump 1272D, and the fifth hydraulic pump 1272E. That is, the work equipment speed estimation unit 1107 estimates the speed of the work equipment 130 when the swing body 120 is swinging, based on the flow rate obtained by subtracting the discharge flow rate of the sixth hydraulic pump 1272F from the sum of the discharge flow rates of all the hydraulic pumps.

When the operation signal input unit 1103 receives the input of the loading command signal, the movement processing unit 1108 generates an operation signal for moving the bucket 133 to the loading position P13 based on the loading position P13 specified by the loading position specification unit 1105 and the interference avoidance position P12 specified by the avoidance position specification unit 1106. That is, the movement processing unit 1108 generates an operation signal so as to reach the loading position P13 from the excavation completion position P10 via the swing start position P11 and the interference avoidance position P12. Further, the movement processing unit 1108 generates an operation signal of the bucket 133 so that the ground angle of the bucket 133 does not change even when the boom 131 and the arm 132 are driven.

While the swing body 120 is swinging, the interference determination unit 1109 determines whether or not the work equipment 130 interferes with the loading target 200 when the swinging is continued with the current swing speed being maintained, based on the estimated speed of the work equipment 130, the swing speed of the swing body 120, and the interference avoidance position P12.

When the target speed changing unit 1110 determines that the work equipment 130 interferes with the loading target 200, the target speed changing unit 1110 changes the target swing speed so that the work equipment 130 does not interfere with the loading target 200. More specifically, the target speed changing unit 1110 changes the target swing speed based on the time until the height of the work equipment 130 reaches a position higher than the interference avoidance position P12 and the swing angle until the planar position from above the work equipment 130 interferes with the loading target 200.

The operation signal output unit 1111 outputs an operation signal input to the operation signal input unit 1103 or an operation signal generated by the movement processing unit 1108.

<<Operation>>

When the operator of the loading machine 100 determines that the loading machine 100 and the loading target 200 are in a positional relationship in which loading processing is possible to be performed, the operator of the loading machine 100 turns on the switch of the operation device 123. Accordingly, the operation device 123 generates and outputs the loading command signal.

Figure 5:
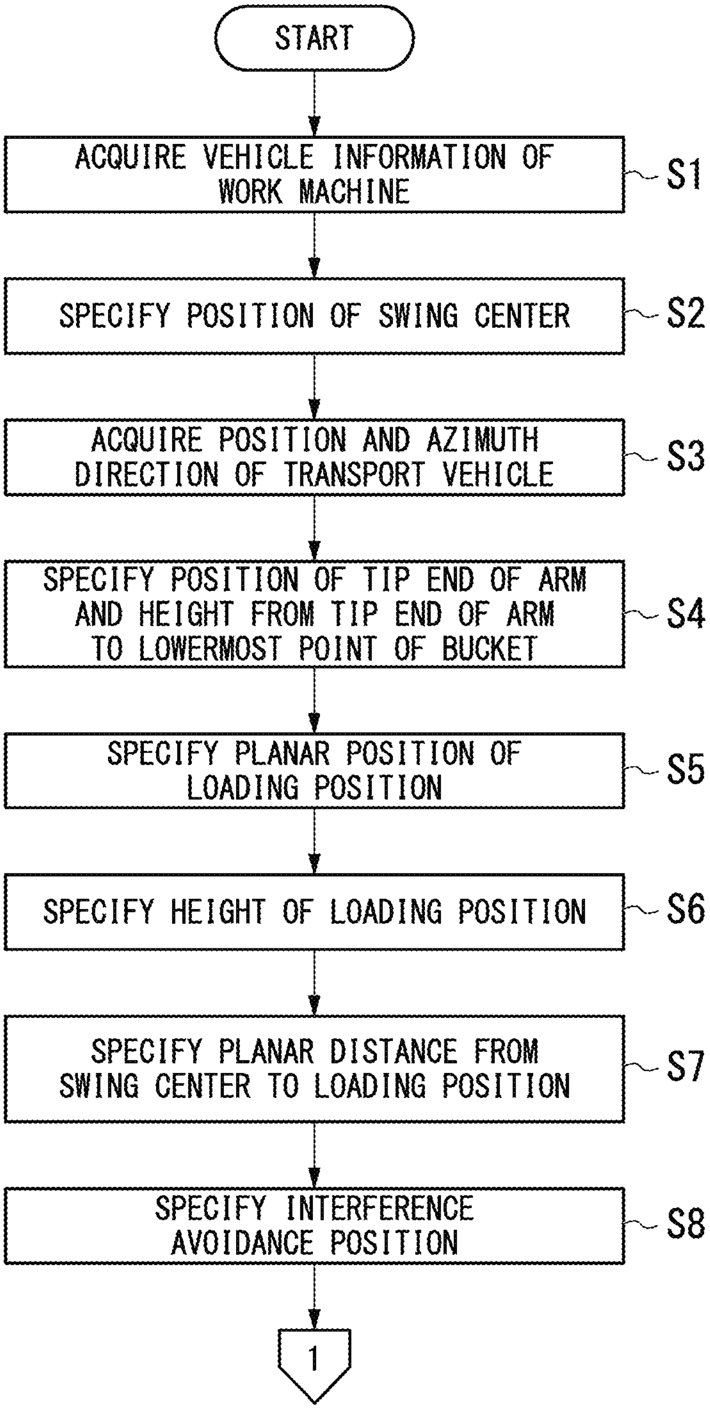
FIG. 5 is a flowchart showing an automatic loading control method according to a first embodiment.
Figure 6:
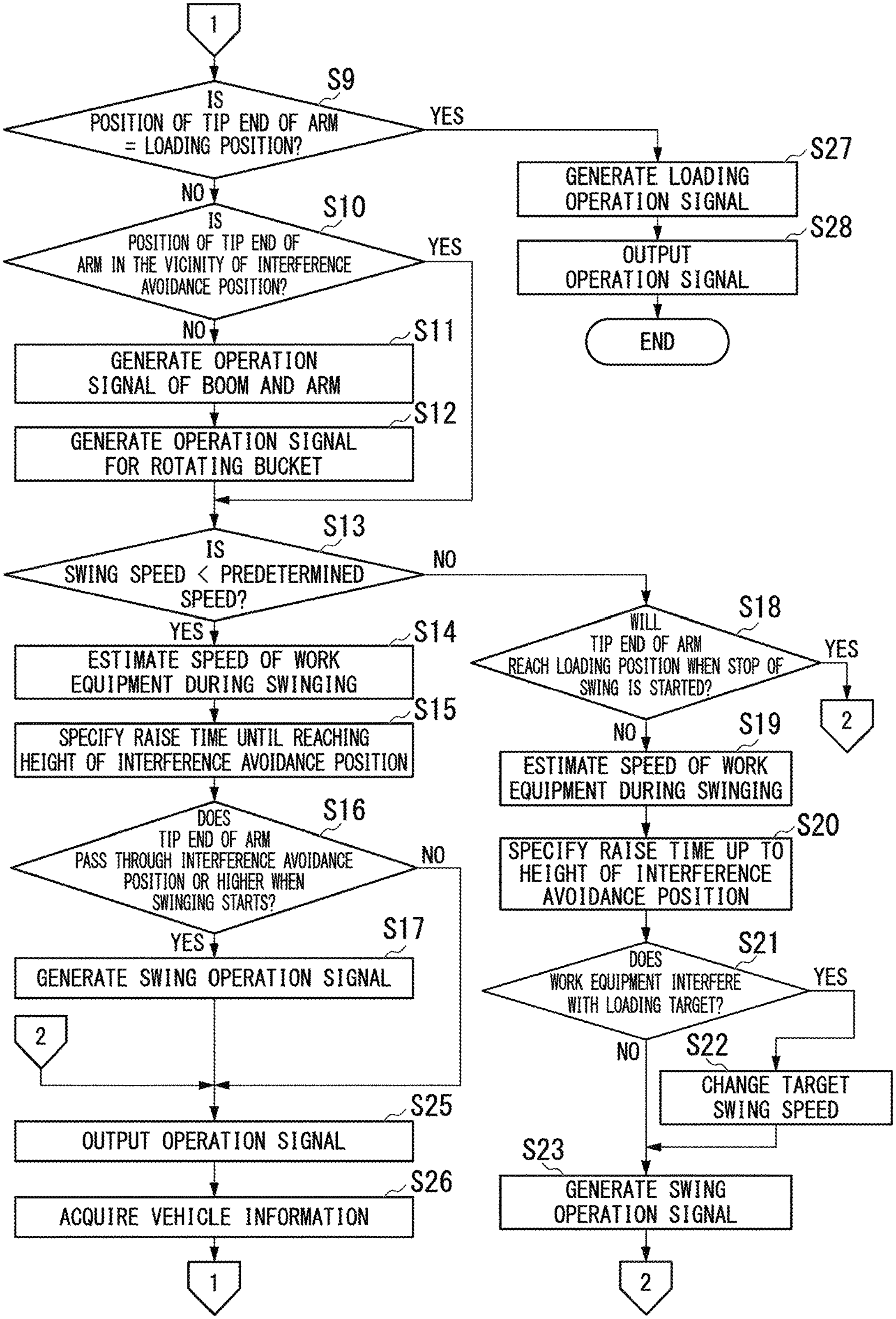
FIG. 6 is a flowchart showing the automatic loading control method according to the first embodiment.

FIG. 5 and FIG. 6 are flowcharts showing an automatic loading control according to the first embodiment. When receiving the input of the loading command signal from the operator, the control device 128 executes the automatic loading control shown in FIG. 5 and FIG. 6.

The vehicle information acquisition unit 1101 acquires the position and the azimuth direction of the swing body 120, the inclination angles of the boom 131, the arm 132, and the bucket 133, and the posture and the swing speed of the swing body 120 (Step S1). The bucket position specification unit 1104 specifies a position of the swing center of the swing body 120 based on the position and the azimuth of the swing body 120 acquired by the vehicle information acquisition unit 1101 (Step S2). The detection information acquisition unit 1102 acquires the three-dimensional position information of the loading target 200 from the detection device 124, and specifies the position and the shape of the loading target 200 from the three-dimensional positional information (step S3).

Based on the vehicle information acquired by the vehicle information acquisition unit 1101, the bucket position specification unit 1104 specifies the position P of the tip end of the arm 132 at the time of inputting the loading command signal and the height Hb from the tip end of the arm 132 to the lowermost point of the bucket 133 (step S4). The bucket position specification unit 1104 specifies the position P as the excavation completion position P10.

The loading position specification unit 1105 converts the position information of the loading target 200 acquired by the detection information acquisition unit 1102 from the site coordinate system to the excavator coordinate system on the basis of the position, the azimuth direction, and the posture of the swing body 120 acquired in step S1. The loading position specification unit 1105 specifies the planar position of the loading position P13 on the basis of the position and the shape of the loading target 200 specified by the detection information acquisition unit 1102 (step S5). At this time, the loading position specification unit 1105 specifies the height of the loading position P13 by adding the height Hb that is from the tip end of the arm 132 to the lowermost point of the bucket 133 and that is specified in step S4 and the height of the control margin of the bucket 133 to the height Ht of the loading target 200 (step S6).

The avoidance position specification unit 1106 specifies a planar distance from the swing center specified in step S2 to the loading position P13 (step S7). The avoidance position specification unit 1106 specifies the position at a position separated by the specified plane distance from the swing center, and the closest position that is from the loading position P13 and at which the outer shape of the bucket 133 does not interfere with the loading target 200 when seen from a plan view, as the interference avoidance position P12 (step S8).

The movement processing unit 1108 determines whether or not the position of the tip end of the arm 132 has reached the loading position P13 (step S9). When the position of the tip end of the arm 132 has not reached the loading position P13 (step S9: NO), the movement processing unit 1108 determines whether or not the position of the tip end of the arm 132 is present in the vicinity of the interference avoidance position P12 (step S10). For example, the movement processing unit 1108 determines whether the difference between the height of the tip end of the arm 132 and the height of the interference avoidance position P12 is less than a predetermined threshold or whether the difference between the plane distance from the swing center of the swing body 120 to the tip end of the arm 132 and the plane distance from the swing center to the interference avoidance position P12 is smaller than a predetermined threshold. When the position of the tip end of the arm 132 is not present in the vicinity of the interference avoidance position P12 (step S10: NO), the movement processing unit 1108 generates an operation signal of the boom 131 and the arm 132 for moving the tip end of the arm 132 to the interference avoidance position P12 (step S11). At this time, the movement processing unit 1108 generates an operation signal on the basis of the positions and the speeds of the boom 131 and the arm 132. Specifically, in order to quickly move the tip end of the arm 132 to the interference avoidance position P12, when the distance between the tip end of the arm 132 and the interference avoidance position P12 is large, the operation signals of the boom 131 and the arm 132 are set to the maximum value. Also, in order to gently stop the tip end of the arm 132, when the distance between the tip end of the arm 132 and the interference avoidance position P12 is small, the operation signals of the boom 131 and the arm 132 are lessened. In addition, an example in which operation signals are generated based on the position of the tip end of the arm 132 has been described, but the present invention is not limited to this example. For example, the operation signals may be independently generated so as to move respectively the angle of the boom 131 and the angle of the arm 132 to the angle of the boom 131 and the angle of the arm 132 when the tip end of the arm 132 coincides with the interference avoidance position P12. Alternatively, the operation signals may be generated so as to generate the target angles or the target speeds of the boom 131 and the arm 132 for moving the tip end of the arm 132 to the interference avoidance position P12 by general feedback control or feedforward control so as to follow the targets.

Also, the movement processing unit 1108 calculates the sum of the angular velocities of the boom 131 and the arm 132 based on the generated operation signals of the boom 131 and the arm 132, and generates an operation signal for rotating the bucket 133 at the same speed as the sum of the angular velocities (step S12). Accordingly, the movement processing unit 1108 can generate an operation signal that holds the ground angle of the bucket 133. In another embodiment, the movement processing unit 1108 may generate an operation signal for rotating the bucket 133 such that the ground angle of the bucket 133 calculated from the detection values of the boom angle sensor 137, the arm angle sensor 138, and the bucket angle sensor 139 is equal to the ground angle at the time of the start of the automatic control.

When the position of the tip end of the arm 132 is in the vicinity of the interference avoidance position P12 (step S10: YES), the movement processing unit 1108 does not generate an operation signal for driving the work equipment. That is, the operation signals of the boom 131, the arm 132, and the bucket 133 are not generated.

The movement processing unit 1108 determines whether the swing speed of the swing body 120 is lower than a predetermined speed on the basis of the vehicle information acquired by the vehicle information acquisition unit 1101 (step S13). That is, the movement processing unit 1108 determines whether or not the swing body 120 is swinging.

When the swing speed of the swing body 120 is lower than the predetermined speed (step S13: YES), the work equipment speed estimation unit 1107 estimates the speed of the work equipment 130 of when the swing body 120 is swinging, based on the sum of the discharge flow rates of the first hydraulic pump 1272A, the second hydraulic pump 1272B, the third hydraulic pump 1272C, the fourth hydraulic pump 1272D, and the fifth hydraulic pump 1272E (step S14). Based on the estimated speed of the work equipment 130, the movement processing unit 1108 specifies a raise time in which the height of the bucket 133 reaches the height of the interference avoidance position P12 from the height of the excavation completion position P10 (step S15). When the swing operation signal is output from the current time based on the raise time of the bucket 133, the movement processing unit 1108 determines whether the tip end of the arm 132 passes through the interference avoidance position P12 or a point higher than the interference avoidance position P12 (step S16). In a case where the tip end of the arm 132 passes through the interference avoidance position P12 or the point higher than the interference avoidance position P12 when the swing operation signal is output from the current time (step S16: YES), the movement processing unit 1108 generates a swing operation signal (step S17). In order to quickly move the tip end of the arm 132 to the interference avoidance position P12, the target swing speed indicated by the swing operation signal is the maximum value of the swing speed of the swing motor 129.

In a case where the tip end of the arm 132 passes through a point lower than the interference avoidance position P12 when the swing operation signal is output from the current time (step S16: NO), the movement processing unit 1108 does not generate the swing operation signal.

When the swing speed of the swing body 120 is equal to or higher than the predetermined speed (step S13: NO), the movement processing unit 1108 determines whether the tip end of the arm 132 will reach the loading position P13 (step S18) when the output of the swing operation signal is stopped from the current time (when the braking of the swing is started). In addition, after the stop of the output of the swing operation signal, the swing body 120 continues to swing by inertia while decelerating, and then stops. In a case where the tip end of the arm 132 will reach the loading position P13 when the output of the swing operation signal is stopped from the current time (step S18: YES), the movement processing unit 1108 does not generate the swing operation signal. Thereby, the braking of the swing body 120 is started.

On the other hand, in a case where the tip end of the arm 132 stops before the loading position P13 when the output of the swing operation signal is stopped from the current time (step S18: NO), the work equipment speed estimation unit 1107 estimates the speed of the work equipment 130 when the swing body 120 is swinging, on the basis of the sum of the discharge flow rates of the first hydraulic pump 1272A, the second hydraulic pump 1272B, the third hydraulic pump 1272C, the fourth hydraulic pump 1272D, and the fifth hydraulic pump 1272E (step S19). Based on the estimated speed of the work equipment 130, the interference determination unit 1109 specifies the raise time from the current height of the bucket 133 to the height of the interference avoidance position P12 (step S20).

When the swing speed of the swing body 120 is maintained based on the vehicle information acquired by the vehicle information acquisition unit 1101, the interference determination unit 1109 determines whether the swing angle of the bucket 133 reaches the swing angle of the interference avoidance position P12 before the raise time has elapsed (step S21). That is, the interference determination unit 1109 determines whether the work equipment 130 interferes with the loading target 200 when the swinging is continued while the current swing speed is maintained. For example, the interference determination unit 1109 calculates the swing angle when the height of the bucket 133 reaches the height of the interference avoidance position P12 by multiplying the current swing speed by the raise time. Then, when the calculated swing angle is less than the swing angle from the current swing position to the interference avoidance position P12, the interference determination unit 1109 determines that the bucket 133 does not reach the interference avoidance position P12 until the raise time has elapsed.

When the interference determination unit 1109 determines that the swing angle of the bucket 133 reaches the swing angle of the interference avoidance position P12 before the raise time has elapsed (step S21: YES), the target speed changing unit 1110 calculates the target swing speed after the change by dividing the swing angle from the current swing position to the interference avoidance position P12 by the raise time (step S22). Then, the movement processing unit 1108 generates a swing operation signal in accordance with the changed target swing speed (step S23). More specifically, the movement processing unit 1108 adds a correction value obtained by multiplying the difference between the current swing speed and the target swing speed by a predetermined gain to the target swing speed. The movement processing unit 1108 substitutes the corrected target swing speed into a function for generating a swing operation signal from the swing speed previously identified by a test or the like, thereby generating a swing operation signal related to the changed target swing speed.

On the other hand, when the interference determination unit 1109 determines that the swing angle of the bucket 133 does not reach the swing angle of the interference avoidance position P12 until the raise time has elapsed (step S21: NO), the target swing speed is not changed. The movement processing unit 1108 generates a swing operation signal in accordance with the target swing speed that has been set in step S17 or the target swing speed that has been changed in step S22 (step S23).

When at least one of the swing operation signal of the swing body 120 and the operation signals of the boom 131, the arm 132, and the bucket 133 is generated in the processing of steps S9 to S23, the operation signal output unit 1111 outputs the generated operation signal to the hydraulic device 127 (step S25). Then, the vehicle information acquisition unit 1101 acquires the vehicle information (step S26). Accordingly, the vehicle information acquisition unit 1101 can acquire vehicle information after being driven by the output operation signal. The control device 128 returns the processing to step S9, and repeatedly executes generation of the operation signal.

On the other hand, in step S9, when the position of the tip end of the arm 132 reaches the loading position P13 (step S9: YES), the movement processing unit 1108 does not generate an operation signal. Therefore, when the position of the tip end of the arm 132 reaches the loading position P13, the work equipment 130 and the swing body 120 are stopped. When the position of the tip end of the arm 132 reaches the loading position P13 (step S9: YES), the movement processing unit 1108 generates an operation signal for performing the loading operation of the bucket 133 (step S27). Examples of the operation signal for causing the loading operation of the bucket 133 include an operation signal for rotating the bucket 133 in the loading direction and an operation signal for opening the clamshell in a case where the bucket 133 is a clam bucket. The operation signal output unit 1111 outputs the generated operation signal to the hydraulic device 127 (step S28). Then, the control device 128 ends the automatic loading control.

Here, the operation of the loading machine 100 during automatic loading control will be described with reference to FIG. 4.

When the automatic loading control is started, the boom 131 and the arm 132 raise from the excavation completion position P10 toward the swing start position P11. At this time, the bucket 133 drives so as to maintain the angle at the time of the end of the excavation.

When the tip end of the arm 132 comes at the swing start position P11, the swing body 120 starts to swing toward the loading position P13. At this time, since the tip end of the arm 132 does not reach the height of the interference avoidance position P12, the raise of the boom 131 and the arm 132 is continued. Also, at this time, as shown in FIG. 4, when the distance from the swing center to the tip end of the arm 132 (position P10*a*, position P10*b*) is different from the distance from the swing center to the interference avoidance position P12, the control device 128 also moves the work equipment 130 in a direction of a swing radius so that the distance from the swing center to the tip end of the arm 132 is equal to the distance from the swing center to the interference avoidance position P12. The boom 131, the arm 132, and the bucket 133 are decelerated so that the height of the tip end of the arm 132 becomes equal to the interference avoidance position P12 while the tip end of the arm 132 moves from the swing start position P11 to the interference avoidance position P12.

When the tip end of the arm 132 comes to the interference avoidance position P12, the driving of the work equipment 130 is stopped. On the other hand, the swing body 120 continues to swing. That is, during the period from the interference avoidance position P12 to the loading position P13, the tip end of the arm 132 moves only by the swing of the swing body 130 regardless of the driving of the work equipment 120. While the tip end of the arm 132 moves from the swing start position P11 to the loading position P13, the swing body 120 decelerates so that the position of the tip end of the arm 132 becomes equal to the loading position P13.

When the tip end of the arm 132 comes to the loading position P13, the driving of the work equipment 130 and the swing body 120 is stopped. Then, the bucket 133 executes the loading operation.

By the automatic loading control described above, the loading machine 100 can automatically load the earth collected by the bucket 133 onto the loading target 200. The operator repeatedly executes the excavation by the work equipment 130 and the automatic loading control by the input of the loading command signal, such that the loading amount of the loading target 200 does not exceed the maximum loading amount.

<<Operation and Effects>>

As described above, according to the first embodiment, the control device 128 of the loading machine 100 generates the work equipment operation signal and the swing operation signal for moving the bucket 133 to the loading point on the basis of a command for starting an automatic movement of the bucket 133, and changes the target swing speed so that the work equipment 130 does not interfere with the loading target 200 while the swing body 120 swings.

Accordingly, the control device 128 can correct the swing speed so that the work equipment 130 does not interfere with the loading target 200 by changing the target swing speed even when the rising speed of the work equipment 130 is lower than the assumed speed or the swing speed of the swing body 120 is higher than the assumed speed after the swing body 120 starts swinging.

According to the first embodiment, the control device 128 changes the target swing speed in a case of determining whether or not the work equipment 130 will interfere with the loading target 200 by the swing operation signal during swinging of the swing body 120 and determining that the work equipment 130 will interfere with the loading target 200. Accordingly, the control device 128 can prevent the interference by realizing a high-speed swing by maintaining the target swing speed when the work equipment 130 does not interfere with the loading target 200 by the control at the current target swing speed, and by changing the target swing speed when the work equipment 130 has a possibility of interfering with the loading target 200 by the control at the current target swing speed. In addition, the control device 128 according to another embodiment may always calculate the target swing speed so that the work equipment 130 does not interfere with the loading target 200 without determining whether or not the work equipment 130 interferes with the loading target 200 by the swing operation signal.

According to the first embodiment, the control device 128 estimates the speed of the work equipment 130 when the swing body 120 is swinging based on the discharge amount of the hydraulic pump, and determines whether or not the work equipment 130 interferes with the loading target 200 based on the estimated speed. That is, the control device 128 according to the first embodiment calculates the speed of the work equipment 130 without performing the differential calculation of the detection value of the sensor. In order to perform the differential calculation with high accuracy, a sensor having a high resolution is required to be used. Further, since the vibration of the work equipment 130, mixing of the noise in the sensor signal, and the like occur, it is difficult to eliminate the inclusion of an error in the detection value. Therefore, according to the first embodiment, it is possible to accurately estimate the speed of the work equipment 130 without using a high-resolution sensor. In addition, the control device 128 according to another embodiment may calculate the speed of the work equipment 130 by the differential calculation of the stroke sensors.

Further, according to the first embodiment, the control device 128 estimates the speed of the work equipment 130 when the swing body 120 is swinging, based on the flow rate obtained by subtracting the flow rate of the operating oil flowing through the swing motor 129 from the discharge flow rate of the hydraulic pump. That is, according to the first embodiment, even when part of the operating oil discharged from the hydraulic pump is supplied to the swing motor 129, it is possible to appropriately estimate the speed of the work equipment 130.

Further, according to the first embodiment, the work equipment 130 is controlled with the maximum value of the operation speed as the target speed, and the swing body 120 is controlled with the maximum value of the swing speed as the target speed. Therefore, the control device 128 estimates the speed of the work equipment 130 when the swing body 120 is swinging based on the maximum discharge flow rate of the hydraulic pump that supplies operating oil to only the actuator of the work equipment 130. That is, the control device 128 can estimate the speed of the work equipment 130 without measuring the discharge flow rate, with the discharge flow rate of the hydraulic pump being a fixed value.

Figure 7:
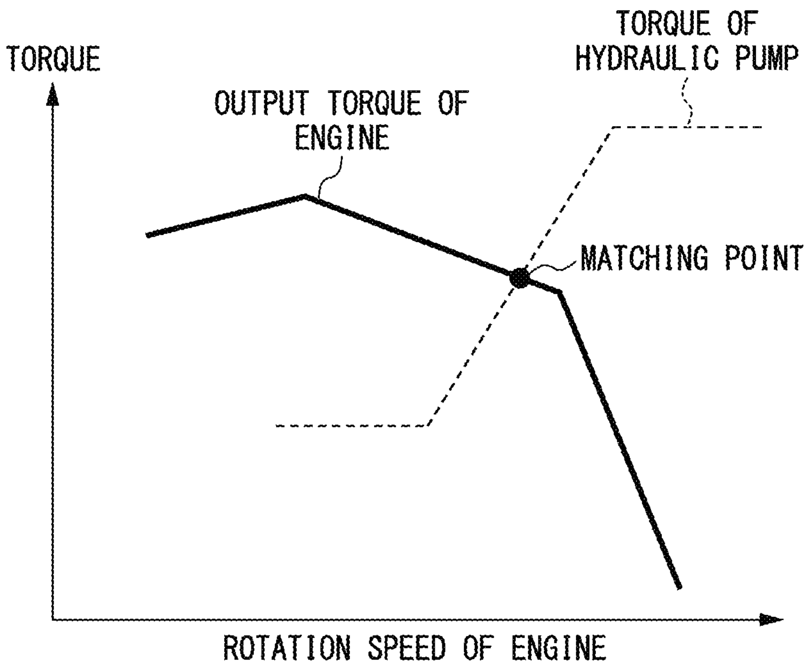
FIG. 7 is a diagram showing an example of a matching relationship between an engine and a pump.

FIG. 7 is a diagram showing an example of a matching relationship between an engine and a pump.

The engine of the loading machine 100 outputs a torque corresponding to a rotation speed. That is, as shown in FIG. 7, the output torque becomes smaller as the rotation speed of the engine increases. On the other hand, the control device 128 controls the capacity of the hydraulic pump by detecting the rotation speed of the engine and a pressure of the hydraulic pump. As a result, the hydraulic pump generates a load torque corresponding to the rotation speed of the engine. As shown in FIG. 7, the torque absorbed by the hydraulic pump increases as the rotation speed of the engine increases.

Therefore, when the rotation speed of the engine increases, the output torque of the engine decreases, and an absorption torque by the hydraulic pump increases, and thus, the rotation speed of the engine starts to decrease. On the other hand, when the rotation speed of the engine decreases, the output torque of the engine increases, and the absorption torque by the hydraulic pump decreases, and thus, the rotation speed of the engine starts to increase. By repeating this, the engine and the hydraulic pump stably operate at a matching point where the rotation speed of the engine, the output torque of the engine, and the rotation speed and the absorption torque of the hydraulic pump match.

When the rotation speed of the engine is a fixed value and the absorption torque by the hydraulic pump and the output torque of the engine match each other, the discharge flow rate of the pump is calculated by dividing the engine output horsepower by the pump pressure. Since the distance between the loading machine 100 and the loading target 200 and the loading amount of the bucket 133 are substantially the same every time, the cylinder pressure of the work equipment 130 and the pressure of the hydraulic pump during the operation also become substantially the same every time. Therefore, the control device 128 can estimate the speed of the work equipment 130 with the discharge flow rate of the hydraulic pump being a fixed value.

Other Embodiments

Although one embodiment has been described above in detail with reference to the drawings, the specific configuration is not limited to the above, and various design changes and the like can be made.

Further, the loading machine 100 according to the first embodiment specifies the loading position P13 and the interference avoidance position P12 on the basis of the three-dimensional position of the loading target 200 detected by the detection device 124, but the present invention is not limited thereto. For example, the loading machine 100 according to another embodiment may specify the loading position P13 and the interference avoidance position P12 on the basis of the coordinates of the loading target 200 input by the operator. When the loading machine 100 includes an input device such as a touch panel on the operator's seat 122, the control device 128 may specify the loading position P13 and the interference avoidance position P12 by inputting the coordinates of the loading target 200 to the input device by the operator. Further, for example, the loading machine 100 according to another embodiment may store the loading operation to the loading target 200 at the first round by the manual operation of the operator, and specify the loading position P13 and the interference avoidance position P12 based on the loading operation.

In another embodiment, when the loading target 200 is fixed, the loading machine 100 may specify the loading position P13 and the interference avoidance position P12 on the basis of the known position of the loading target 200. For example, when the loading target 200 is a transport vehicle having a function of identifying the vehicle position by the GNSS, the loading machine 100 may acquire information indicating the position and the azimuth direction from the loading target 200 stopped at a loading place, and specify the loading position P13 and the interference avoidance position P12 based on the information.

In addition, in the above-described embodiment, the control device 128 raises the work equipment 130 in order to retract the work equipment 130, but other retracting methods may be used. For example, in another embodiment, the work equipment 130 may be retracted by raising the work equipment 130, and may be retracted by setting the work equipment 130 in a contracted posture. The posture in which the work equipment 130 is contracted means that the arm 132 is rotated so as to be close to the swing body while the boom 131 is moved up. Accordingly, it may be configured so as to avoid interference with the loading target 200 by the posture of the work equipment 130 becoming a posture that contracts in the direction of the swing radius and the work equipment 130 becoming such a posture.

Further, although the control device 128 according to the above-described embodiment calculates the discharge flow rate of the hydraulic pump as a fixed value, the present invention is not limited thereto. For example, the control device 128 according to another embodiment may calculate the discharge flow rate of the hydraulic pump by the product of a command value or a measurement value of a pump capacity and a command value or a measurement value of the rotation speed of the engine. Further, for example, the control device 128 according to another embodiment may calculate the discharge flow rate of the hydraulic pump by dividing a command value or a measurement value of the engine output horsepower by the pump pressure.

The control device of the loading machine according to the present invention can control a swing so that the bucket and the loading target do not interfere with each other during a swing in automatic loading.

The invention claimed is:

1. A control device for controlling a loading machine including a swing body that swings about a swing center and work equipment that is attached to the swing body and has a bucket, the control device comprising:
a processor including
a movement processing unit that generates
a work equipment operation signal in order to move the bucket to a loading point, and
a swing operation signal related to a target swing speed,
the work equipment operation signal and the swing operation signal being generated based on a command for starting a moving operation in order to move the bucket to the loading point without an operation of an operator;
an interference determination unit that determines whether or not the work equipment interferes with the loading target by the swing operation signal during swinging of the swing body; and
a target speed changing unit that changes the target swing speed when the interference determination unit determines that the work equipment interferes with the loading target.

2. The control device according to claim 1, wherein the target speed changing unit changes the target swing speed based on a time until
a height of the work equipment reaches a position higher than the loading target and
a swing angle until a planar position from above the work equipment interferes with the loading target.

3. The control device according to claim 1, wherein
the processor further includes
a work equipment speed estimation unit that estimates a speed of the work equipment when the swing body is swinging,
the interference determination unit determining whether or not the work equipment interferes with the loading target based on the estimated speed of the work equipment.

4. The control device according to claim 3, wherein
the loading machine further includes
a pump that discharges operating oil, and
a swing motor that swings the swing body by the operating oil, and
the work equipment speed estimation unit estimates the speed of the work equipment when the swing body is swinging, based on a flow rate obtained by subtracting a flow rate of operating oil flowing through the swing motor from the discharge flow rate of the pump.

5. The control device according to claim 4, wherein
the loading machine further includes
an actuator that actuates the work equipment,
a work equipment-side flow rate control valve that controls a flow rate of operating oil flowing through the actuator, and
a swing-side flow rate control valve that controls a flow rate of operating oil flowing through the swing motor,
the pump includes
a first pump connected only to the work equipment-side flow rate control valve, and
a second pump connected to the swing-side flow rate control valve and the work equipment-side flow rate control valve, and
the work equipment speed estimation unit estimates the speed of the work equipment when the swing body is swinging, based on a discharge flow rate of the first pump.

6. A control method for a loading machine including a swing body that swings about a swing center and work equipment that is attached to the swing body and has a bucket, the control method comprising:
generating
a work equipment operation signal in order to move the bucket to a loading point, and
a swing operation signal related to a target swing speed,
the generating the work equipment operation signal and the swing operation signal being based on a command for starting a moving operation in order to move the bucket to the loading point without an operation of an operator;
determining whether or not the work equipment interferes with the loading target by the swing operation signal during swinging of the swing body; and
changing the target swing speed when the interference determination unit determines that the work equipment interferes with the loading target.

* * * * *